No. 621,412. Patented Mar. 21, 1899.
C. HEWITT.
TRANSFER WATTMETER SWITCH FOR STORAGE BATTERY CIRCUITS.
(Application filed May 13, 1898.)
(No Model.) 2 Sheets—Sheet 1.
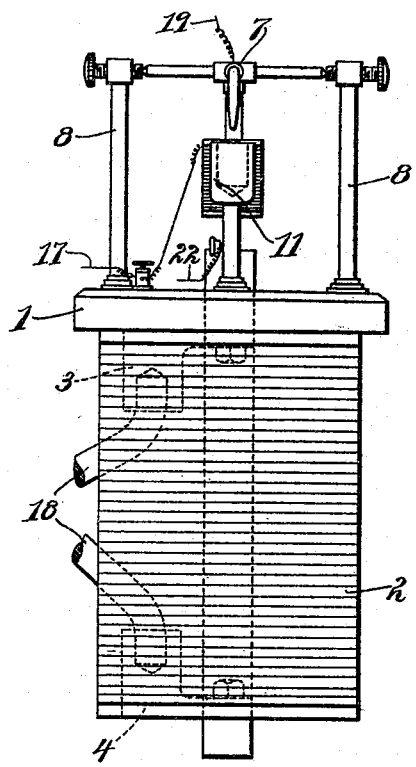
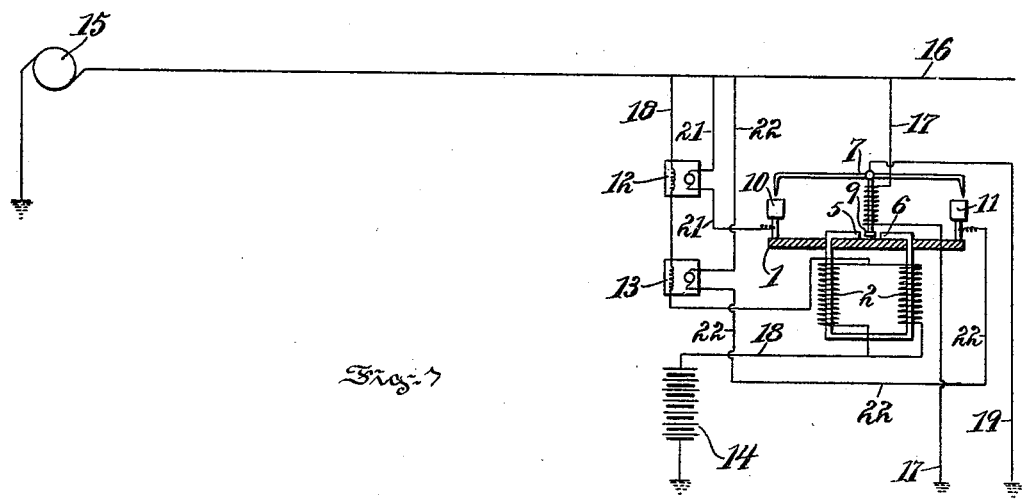

No. 621,412. Patented Mar. 21, 1899.
C. HEWITT.
TRANSFER WATTMETER SWITCH FOR STORAGE BATTERY CIRCUITS.
(Application filed May 13, 1898.)
(No Model.) 2 Sheets—Sheet 2.
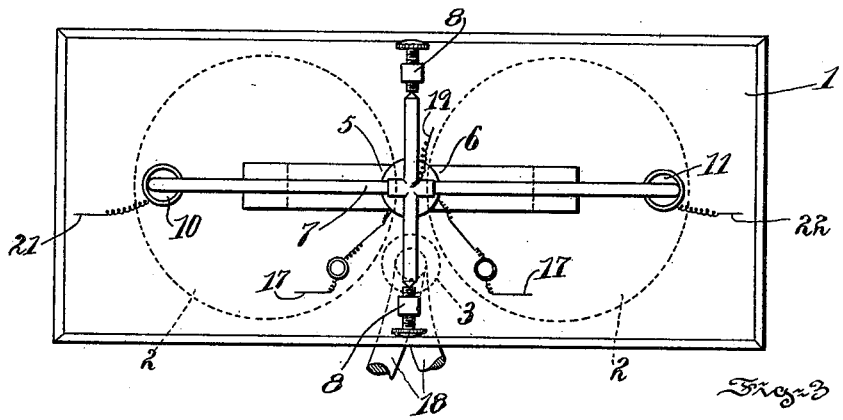
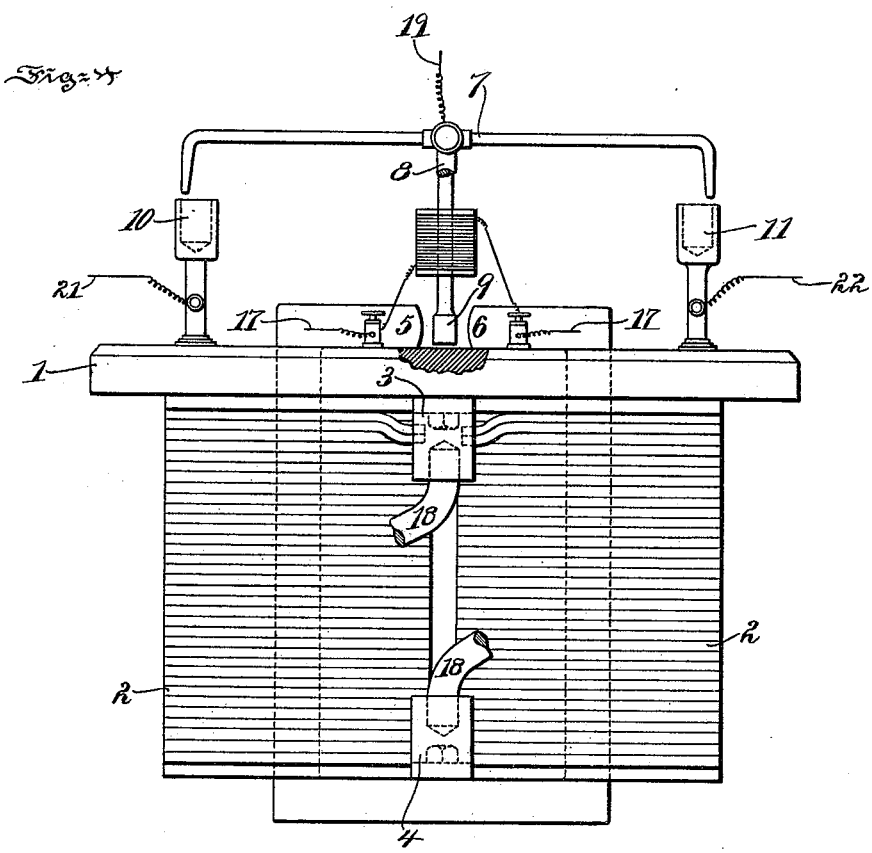

UNITED STATES PATENT OFFICE.

CHARLES HEWITT, OF PHILADELPHIA, PENNSYLVANIA, ASSIGNOR TO THE ELECTRIC STORAGE BATTERY COMPANY, OF SAME PLACE.

TRANSFER WATTMETER-SWITCH FOR STORAGE-BATTERY CIRCUITS.

SPECIFICATION forming part of Letters Patent No. 621,412, dated March 21, 1899.

Application filed May 13, 1898. Serial No. 680,545. (No model.)

*To all whom it may concern:*

Be it known that I, CHARLES HEWITT, a citizen of the United States, residing at the city of Philadelphia, in the county of Philadelphia and State of Pennsylvania, have invented a new and useful Transfer Wattmeter-Switch for Storage-Battery Circuits, of which the following is a specification.

The object of the invention is to provide apparatus for measuring current supplied to and from a storage battery working in connection with a dynamo or generator and a working circuit.

To this end my invention comprises the improvements hereinafter described and claimed.

The nature, characteristic features, and scope of my invention will be more fully understood from the following description, taken in connection with the accompanying drawings, forming part hereof, and in which—

Figure 1 is a view illustrating, diagrammatically, apparatus embodying features of my invention. Fig. 2 is an end view drawn to an enlarged scale and illustrating a switch device or instrument embodying features of the invention and Figs. 3 and 4 are respectively a top or plan view and a side or elevational view of the apparatus shown in Fig. 2.

A suitable base 1 carries an electromagnet of which the coils 2 are placed in parallel or series and provided with terminals 3 and 4, and of which the core may be advantageously laminated and is arranged in such manner that its ends 5 and 6 are in proximity with each other.

7 is a switch-lever suitably journaled or pivotally supported, for example, by means of standards 8, which may be insulated from the base 1 in any suitable manner. The switch-lever 7 is provided with a polarized armature 9, arranged between the poles 5 and 6.

10 and 11 are contacts, as mercury-cups, disposed in range of the ends of the switch-lever and suitably insulated from the base 1.

The described instrument is used in connection with wattmeters 12 and 13 or their equivalents, and with a storage battery 14, a generator or generators 15, and a working circuit or conductor 16. The battery 14 is in multiple relation and either takes current from or delivers it to the line 16. The coil on the polarized armature 9 is energized in some suitable manner. The branch conductor 17 of comparatively high resistance constitutes suitable means for the accomplishment of this purpose. The battery-conductor 18 is led through the wattmeters 12 and 13 in series—for example, through the parts thereof that might be designated "fields"—and thence through the coils 2 of the electromagnet and thence to the battery. When the battery is charging, the polarized armature is drawn, for example, toward the left in Fig. 1, and when the battery is discharging it is drawn toward the right by reason of the reversal in the direction of flow of the current in the coils 2. The contacts or mercury-cups 10 and 11 are respectively in electrical connection with the working circuit or conductor 16 by way of the conductors 21 and 22 and through those parts of the wattmeters which may be designated the "armatures." The switch-lever 7 is connected to ground by way, for example, of the conductor 19. When the polarized armature 9 is drawn toward the left in Fig. 1 by reason of a charge traversing the coils 2 and entering the battery, the circuit 22, wattmeter 13, and conductor 19 are closed, and since this is assumed to be what might be called the "armature-circuit" of the wattmeter it follows that the latter is operative and shows that the battery is being charged, and also indicates in watts the extent of the charge. During the occurrence of the above-described operation what might be called the "armature-circuit" of the wattmeter 12 is interrupted, so that the latter is inoperative. When the battery is discharging, the polarized armature 9 is drawn toward the right in Fig. 1, the armature-circuit of the wattmeter 13 is interrupted, and the armature-circuit of the wattmeter 12 is closed by way of the contact-cup 10 and conductors 19 and 21, so that the wattmeter 12 is operative and indicates that the battery is discharging and also the extent of the discharge in watts.

It will be obvious to those skilled in the art to which my invention appertains that modifications may be made in details without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

In combination a battery and its conductor, two recording devices, an electromagnet responding to the electrical condition of said conductor, and a polarized armature coöperating with said magnet and provided with connections for connecting and disconnecting one or the other of said recording devices, substantially as described.

In testimony whereof I have hereunto signed my name.

CHAS. HEWITT.

In presence of—
  W. F. JACKSON,
  K. M. GILLIGAN.